(12) United States Patent
Kuniyoshi et al.

(10) Patent No.: US 7,973,274 B2
(45) Date of Patent: Jul. 5, 2011

(54) TACTILE SENSOR MODULE WITH A FLEXIBLE SUBSTRATE ADAPTED FOR USE ON A CURVED SURFACE AND METHOD OF A MOUNTING TACTILE SENSOR

(75) Inventors: Yasuo Kuniyoshi, Tokyo (JP); Yoshiyuki Ohmura, Tokyo (JP); Naoko Seta, Tokyo (JP); Akihiko Nagakubo, Ibaraki (JP)

(73) Assignees: The University of Tokyo, Tokyo (JP); National Institute Of Advanced Industrial Science And Technology, Tokyo (JP)

( * ) Notice: Subject to any disclaimer, the term of this patent is extended or adjusted under 35 U.S.C. 154(b) by 681 days.

(21) Appl. No.: 12/065,966

(22) PCT Filed: Sep. 5, 2006

(86) PCT No.: PCT/JP2006/317541
§ 371 (c)(1),
(2), (4) Date: Mar. 6, 2008

(87) PCT Pub. No.: WO2007/032227
PCT Pub. Date: Mar. 22, 2007

(65) Prior Publication Data
US 2009/0134318 A1 May 28, 2009

(30) Foreign Application Priority Data

Sep. 12, 2005 (JP) .................................. 2005-263325

(51) Int. Cl.
*G01J 1/56* (2006.01)
(52) U.S. Cl. ............................... 250/231.19; 73/862.041

(58) Field of Classification Search ............. 73/862.041; 250/231.19; 200/521
See application file for complete search history.

(56) References Cited

U.S. PATENT DOCUMENTS

| 4,830,014 A | * | 5/1989 | Goodman et al. ............. 600/310 |
| 4,839,512 A | * | 6/1989 | Speck ......................... 250/231.1 |
| 5,479,528 A | * | 12/1995 | Speeter ......................... 382/115 |
| 6,216,545 B1 | * | 4/2001 | Taylor ....................... 73/862.046 |
| 2005/0132290 A1 | * | 6/2005 | Buchner et al. ............... 715/702 |
| 2006/0260417 A1 | * | 11/2006 | Son et al. ................. 73/862.046 |
| 2009/0033341 A1 | * | 2/2009 | Son et al. ........................ 324/663 |

FOREIGN PATENT DOCUMENTS

| JP | 64-16902 | 1/1989 |
| JP | 11-83420 | 3/1999 |
| JP | 2001-66371 | 3/2001 |
| JP | 2003-207404 | 7/2003 |
| WO | 99/04234 | 1/1999 |

* cited by examiner

*Primary Examiner* — Georgia Y Epps
*Assistant Examiner* — Kevin Wyatt
(74) *Attorney, Agent, or Firm* — Ladas & Parry, LLP

(57) ABSTRACT

The invention provides a tactile sensor module that enables adjustment of the density of sensing elements and adjustment of mounting regions to be carried out in a straightforward manner with one type of module that is highly adaptive to complex curved surfaces. A tactile sensor module comprises a flexible substrate having one or a plurality of strips, a plurality of sensing elements arranged at the one or plurality of strips of the flexible substrate, one or more communication terminals provided at the flexible substrate; and at least one electronic circuit section provided at the flexible substrate having communication functions. At least one of the strips comprises a foldable region and/or a cuttable region.

35 Claims, 14 Drawing Sheets

TACTILE SENSOR MODULE WITH A FLEXIBLE SUBSTRATE ADAPTED FOR USE ON A CURVED SURFACE AND METHOD OF A MOUNTING TACTILE SENSOR

FIELD OF THE INVENTION

The present invention relates to a tactile sensor, and particularly relates to a tactile sensor capable of being mounted to arbitrary curved surfaces.

BACKGROUND OF THE INVENTION

The need for tactile sensors distributed over the whole body has been increasing in the field of robots and humanoids. Whole body tactile sensors are tactile sensors that make it possible to provide tactile sense to the whole of a system. Most of research regarding tactile sensors relates to single sensor characteristics. The target of the research is how to detect characteristics for fineness of hand such as smooth or rough. The research is also taking place into how to give an input interface of a computer a sense of touch. According to most of the tactile sensor research in the related art, importance has been placed on the characteristics obtained. However, from the point of view of implementation of tactile sensors, application to the appropriate curved shape, ease of manufacture and ease of adjusting the mounting region are desired.

In addition to the field of robotics, tactile sensors are also desirable in the field of medicine, health and welfare, for measuring pressure distribution for the surfaces of chairs and beds, etc. This is for utilization in product development such as investigating comfort, etc., monitoring of patients, and for motion measuring and rehabilitation. In this kind of case also, a pressure distribution sensor capable of application to curved shapes is useful.

In order to implement a distributed tactile sensor, it is necessary to enable application to curved surfaces and to bring about countermeasures for problems with respect to wiring. Moreover, it is necessary to enable adjustment of mounting regions because the size and shape of the mounting region differs according to the system mounted on. However, there are no conventional tactile sensors that simultaneously satisfy all of the requirements of application to curved surfaces, problems with respect to wiring and adjustment for the mounting region while sufficiently taking into consideration manufacturing methods and costs.

When mounting tactile sensors on a system, a flexible substrate may be used in order to reduce wiring costs. In this regard, according to the related art, the arrangement of pressure sensors on the substrate is fixed, and density adjustment is not possible. Further, pressure sensors such as pressure-sensitive rubber etc. can only measure pressure in the vicinity of the sensor. The detection range therefore has to be broadened by changing the size of the pressure sensors in order to change the density. Individual products are therefore required to achieve density adjustment and cost increases are incurred.

When wiring the pressure sensors individually, the amount of wiring increases dramatically. A matrix type wiring system is therefore typically used that is capable of managing n×m pressure sensor signals using n+m wires. In this case, each sensor shares n vertical wires and m horizontal wires. This gives a substrate shape that consists of a one piece region overall. As a result, even when a flexible substrate is used, and even if application is possible to simple curved surfaces such as with a cylindrical shape, application to complex curved surfaces such as the shoulders or elbow of a robot is difficult.

In the related art, when tactile sensors are used in non-stationary regions such as the shoulders or elbow of a robot, products are custom-designed in line with the shapes of the individual regions. This is mainly caused by the size and shape of the regions the tactile sensors are to be mounted on changing substantially depending on the target. In this respect, there are therefore no conventional tactile sensors that take into consideration adjustment of sensor mounting regions after production.

Various pressure sensors exist such as pressure-sensitive resistors, capacitance-type pressure-sensitive elements, and piezoelectric elements. However, when such elements are adopted, there is no ability to provide interpolation with properties that can be calculated from a ratio of two sensed quantities for pressure acting between two pressure sensors. This means that a large number of sensors are required to increase resolution. In this respect, according to the pressure sensing method disclosed in patent document 1, light is emitted by light-emitting elements to light scattering elastic material that scatters and reflects light, with the amount of light scattered/reflected then being measured using light-receiving elements. This is based on the theory that when pressure is applied to a light scattering elastic member which scatters/reflects light, the amount of scattering/reflection changes with deformation and it is therefore possible to measure the amount of pressure. Hereinafter, this is referred to as the light-scattering type pressure-sensing method. When pressure is applied to a certain point of a light-scattering elastic member, the influence of the deformation extends from the pressure point to a point a certain amount away from the pressure point. This means that it is possible to detect pressure at a set of a light-receiving element and a light-emitting element at a certain distance away from the pressure point. The influence of the changes in pressure becomes smaller further away from the pressure point. When pressure is then applied to a point between two points where measurements are carried out by two sets of light-receiving elements and light-emitting elements, it is possible to know which point between the two points is being subjected to pressure from the ratio of pressure values for the two points measured. Further, it is also possible to estimate this pressure value from the sum of the pressure values for the two points. From the above theory, it is clear that interpolation can be implemented by the light-scattering type pressure-sensing method. Further, the light-scattering type pressure-sensing method has the feature that sensitivity adjustment can be achieved in a straightforward manner by changing a light-scattering elastic member that scatters/reflects light. However, in the case of the mounting method using optical fibers disclosed in Japanese Patent Document 1, there is the problem that compactness and automation of manufacture is difficult.

As foregoing, tactile sensors of the related art employing a flexible substrate for wiring have the following disadvantages.
(1) Different products are required for both the wiring substrate and the pressure sensors when a different density is required.
(2) Adjustment of the mounting region after manufacture cannot be considered.
(3) Products with different sensors according to sensitivity are necessary when different sensitivities are required.
(4) A wiring substrate can only be applied to simple curves.
Patent Document 1: WO 99/04234 (U.S. Pat. No. 3,653,284)
Patent Document 2: Japanese Unexamined Publication No. 64-16902

DISCLOSURE OF THE INVENTION

When considering modularizing a number of sensing elements and a communication function and connecting them using a small amount of wiring, the number of types of module manufactured should be small. Complexity increases as the number of types of module gets larger and manufacturing costs also rise. On the other hand, the number of tactile sensing elements required changes according to the system that mounts the distributed tactile sensors and it is typical for the mounting density for the necessary tactile sensing elements to differ in the same system depending on the mounting location. From this point of view, modularizing tactile sensors in such a manner that changing of the number of tactile sensing elements and changing of the installation density is possible is desired.

It is therefore an object of the present invention to provide a tactile sensor module that enables adjustment of the density of sensing elements and adjustment of mounting regions to be carried out in a straightforward manner with one type of module that is highly adaptive to complex curved surfaces.

It is a further object of the present invention to provide a tactile sensor mounting method that is capable of adjusting sensing element density and adjusting mounting regions.

It is a still further object of the present invention to provide a tactile sensor module provided with sensing elements appropriate for automatic manufacture where sensitivity adjustment is straightforward.

According to the present invention, there is provided a tactile sensor module comprises a flexible substrate having one or a plurality of strips, a plurality of sensing elements arranged at the one or plurality of strips of the flexible substrate, one or more communication terminals provided at the flexible substrate, and at least one electronic circuit section provided at the flexible substrate, said electronic circuit section being electrically connected to said sensing elements and communication terminals via wiring extending at the flexible substrate, and said electronic circuit section having communication functions for receiving information acquired by each sensing element and for transmitting the information to the communication terminals. At least one of said strips comprises a foldable region and/or a cuttable region. In the description, a "sensing element" refers to a single measuring device for measuring a physical quantity such as pressure, temperature, light, or sound, and may include pressure sensors, temperature sensors, optical sensors, and sound sensors.

In a preferred embodiment, the foldable region is one or a plurality of strips positioned between any of the sensing elements of the plurality of sensing elements, and/or one or a plurality of portions of the one or a plurality of strips positioned between any of the sensing elements. By folding a region between the sensing elements spaced apart via the strip, it is then possible to change the distance between the sensing elements. It may be preferable in this case also for portions other than those between sensing elements, for example, the strip between the communication terminal and the sensing element, to comprise a foldable region. When a plurality of tactile sensor modules are connected via communication terminals, a strip positioned between the sensing element and the communication terminal of the same tactile sensor module is regarded as a strip between the sensing elements of the tactile sensor comprised of a plurality of tactile modules as a whole.

The foldable region is a region of the strip having only wiring. In a preferred mode, the foldable region is a region of the strip constituting the flexible substrate without the sensing elements, the electronic circuit section, and the communication terminals.

The cuttable region is a region where said region can be cut to remove one or plurality of sensing elements from the flexible substrate while maintaining the communication function for sensing signals of one or a plurality of remaining sensing elements.

In a preferred mode, the sensing element is provided at a distal end portion of a strip. The distal end portion of the strip the sensing elements are provided on constitutes the distal end portion of the flexible substrate. In addition to the sensing elements provided at the distal end portion of the strip, it is also possible to provide sensing elements at portions other than the distal end portions of the strips. It is further preferable to provide the communication terminals at the distal ends of the strip.

The present invention is by no means limited regarding the shape and arrangement of the strips constituting the flexible substrate. The following serves merely as an example of several preferred modes.

According to a first embodiment, the flexible substrate comprises a first strip-shaped body and a plurality of second strip-shaped bodies connected to the first strip-shaped body. The first strip-shaped body comprises one or a plurality of strips and at least one electronic circuit section. The second strip-shaped body comprises one or a plurality of strips and at least one sensing element at a distal end thereof. Preferably, the second strip-shaped body is a foldable region having only wiring exclusive of a sensing element installation portion. It is also preferable for at least one second strip-shaped body to have a cuttable region can be cut to remove one or more sensing elements of the second strip-shaped body from the flexible substrate while maintaining the communication function for sensing signals of at least one sensing element of the second strip-shaped body.

According to a first embodiment, the second strip-shaped body may be configured from a tree structure where a plurality of strips diverge in a hierarchical manner and one or more sensing elements are provided at distal end portions of each branched strip. Here, "distal end portion" is a strip positioned at a branch at the distal end of a tree structure. In one example, the second strip-shaped body is comprised of a base with a proximal side connected to the first strip-shaped body, and an H-shaped strip section comprised of four branched strips formed integrally at a distal end of the base. One or more sensing elements are then provided at distal end portions of each branched strip. It is also preferable for each branched strip of the second strip-shaped body to have a cuttable region where said cuttable region can be cut to remove one or more sensing elements of the branched strips from the flexible substrate while maintaining the communication function for sensing signals of one or more sensing elements of the remaining branched strips. According to a first embodiment, the first strip-shaped body is preferably provided with at least one communication terminal at a distal end thereof. It is also preferable at the first strip-shaped body for a portion exclusive of the electronic circuit section and the communication terminals to have a foldable region having only wiring. It is further preferable for the first strip-shaped body to have a cuttable region where said cuttable region can be cut to remove one or more sensing elements of the first strip-shaped body and/or the second strip-shaped body connected to the first strip-shaped body from the flexible substrate while maintaining the communication function for sensing signals of at least one sensing element. It is also preferable for the first strip-shaped body to be configured from a plurality of radially extending strips with proximal ends thereof being connected to each other, and the electronic circuit section is arranged at the connected portion of the proximal ends.

According to a second embodiment, at least portions of the flexible substrate are configured from a tree structure where one or a plurality of strips diverge hierarchically. One or more sensing elements are provided at least two distal end portions of the distal end portions of each strip. It is preferable to provide communication terminals for at least one distal end portion of the distal end sections of each strip. It is also possible to configure the whole of the flexible substrate from a tree structure. The branched strips constituting the tree structure have foldable regions and/or cuttable regions. In one aspect, one or more sensing elements are provided at distal end portion of the each of branched strips and each branched strip having a sensing element at the distal end portion may have a cuttable region where said cuttable region can be cut to remove one or more sensing elements of the branched strips from the flexible substrate while maintaining the communication function for sensing signals of one or more sensing elements of the remaining branched strips.

According to a third embodiment, the flexible substrate is configured from a star structure where a plurality of strips are connected at the base end side. A communication terminal is then provided at a distal end of at least one strip. One or more sensing elements may be provided at distal end portions of the remaining strips and the electronic circuit section may be provided at a connected portion on the base end side of the strips. Each strip constituting the star structure has a foldable region and/or a cuttable region.

According to a fourth embodiment, the strip is comprised of a base and a wide section formed integrally at a distal end of the base. One or a plurality of sensing elements are provided at the wide section. The strip-shaped base has a foldable region and/or a cuttable region.

It is also preferable for the communication terminal to be a serial communication terminal. Wiring for between the electronic circuit section and the communication terminals is a serial bus.

In a preferred mode, the electronic circuit section is provided with a processor unit, is capable of serial communication with an external device via the serial communication terminals, and is configured so as to be capable of sending information acquired by the sensing elements to the external device.

Further, an analog-digital converter is provided. Analog information acquired by the sensing elements is then taken in by the processor unit as digital information.

In a preferred mode, the tactile sensor module is capable of being connected to other tactile sensor modules via the communication terminals. This connection is taken to be a function where it is possible to exchange information with each tactile sensor module and with an external device using the communication function when the communication terminals of the tactile sensor modules are electrically connected to the communication terminals of other tactile sensor modules.

In a preferred mode, the sensing element is a pressure sensor. A pressure sensor refers to an element capable of extracting pressure signals by changing current and voltage according to pressure on the circuit. A pressure-sensitive resistor, capacitance type pressure-sensitive element, piezoelectric element, strain gauge, photodiode, phototransistor, reflective photointerrupter, etc may be illustrated as pressure sensors.

Typically, tactile perception due to a sensing element can be considered to be binary information as to whether or not touching takes place, pressure distribution information, and 6 axis force information for a point of contact etc. but is preferably limited to pressure distribution information. In a further preferred mode, the pressure sensor is provided with a light-emitting element and a light-receiving element. The tactile sensor module further comprises light-scattering elastic material capable of scattering light. The elastic material is then provided on the flexible substrate so as to cover the pressure sensing section. Light emitted from the light-emitting element is then scattered and reflected within the elastic material and the light-receiving element acquires an intensity signal for the light. An optical pressure sensor is given as a preferred example of the pressure sensor. Optical pressure sensor includes reflective photointerrupters constituted by a light-emitting element and a light-receiving element, an LED and photodiode, and LED and phototransistor, and an LED and photodiode or phototransistor. It is also preferable for the elastic material to be urethane foam.

In a preferred mode, detection by the optical pressure sensor is carried out using time-sharing control defined as follows. For example, a description is given of a reflective photointerrupter comprised of an LED and a phototransistor. Time sharing control is control for extracting all of the sensor outputs independently for the N reflective type photointerrupters by using a smaller number of n analog-digital converters. m LED switches that simultaneously put from one to a maximum of n LEDs ON are prepared. The LED switches are LED drive circuits controlled by a processor. At this time, $m \times n \geqq N$ has to be satisfied. A signal for a group of Pi phototransistors of a reflective type photointerrupter where LEDs are controlled to go ON and OFF by m LED switches $i(i=1 \ldots m)$ does not share the analog-digital converter but rather just different groups of phototransistors share the analog-digital converter. Based on this condition, it is possible to extract a value for an analog-digital converter when the LED switch of the m LED switches goes ON as the sensor output of the group Pi of phototransistors. In this way, it is possible to define time sharing control by extracting sensor outputs from common lines by exerting control so that just one group of LED switches only goes ON.

A further embodiment is related to a method of mounting a tactile sensor using the tactile sensor modules and the method comprises adjusting a position or positions of sensing elements by folding one or a plurality of strip; and/or reducing the number of sensing elements by cutting out one or a plurality of strips; and adjusting the density of the sensing elements and/or adjusting a mounting region of the sensing elements by folding and/or cutting the strips. One mode includes connecting a plurality of tactile sensor modules via communication terminals in order to measure a broader region. When both folding and cutting of the strips are carried out, the order of the folding process and the cutting process is not limited. Either process may be carried out first, or the folding process and cutting process may be carried out alternately. When the tactile sensor module is made of a light-scattering elastic material such as urethane foam, the order of the step of folding and/or cutting the strips and the step of fitting the light-scattering elastic material to the tactile sensor module is not limited. It is possible to fit the light-scattering elastic material to the tactile sensor module prior to the folding and/or the cutting steps, or to fit the light-scattering elastic material to the tactile sensor module after the folding and/or cutting steps.

The tactile sensor module of the present invention is comprised of a strip-shaped flexible substrate that can be folded and/or cut. Density adjustment, mounting region adjustment, and adaptation to arbitrary curved surfaces are therefore possible with one type and cost reductions for the tactile sensor can be made. Conventional tactile sensors could not have their density adjusted and could not be adapted for arbitrary curved surfaces. This necessitated the use of individual flexible substrates, which contributed to increased costs. The tactile sensor module of the present invention can be mounted on an arbitrary curved surface and can therefore be widely applied as tactile sensors for robots and to pressure distribution measurements for chairs and beds, etc. It is possible to easily construct a tactile sensor for a large surface area by connecting together a number of tactile sensor modules.

By adopting a light-scattering type pressure-sensing method having interpolation properties, in addition to adjustment of density, adjustment of mounting regions, and adapting to curved surfaces, it is possible to implement the sensitivity adjustments in a single module. In the case of conventional tactile sensors employing pressure sensors that cannot adjust sensitivity, it is necessary to develop individual sensors for each region. It is also possible to reduce the amount of wiring by adopting time sharing control in the control of the reflective photointerrupters as the pressure sensors.

DETAILED DESCRIPTION

[A] Basic Configuration of Tactile Sensor Module

According to the present invention, there is provided a tactile sensor module comprising a flexible substrate and a plurality of pressure sensors mounted on the flexible substrate. The flexible substrate is shaped to density adjustment of the sensors and adaptation to curved surfaces. The pressure sensors convert pressure into an electrical signal. The flexible substrate is comprised of a plurality of strips with pressure sensors being provided at distal end portions thereof. Serial communication terminals are provided at distal ends different to the end portions at which the pressure sensors are provided. An electronic circuit section that processes electrical signals indicating amounts of pressure is provided at the flexible substrate. Each pressure sensor and the electronic circuit section, and the electronic circuit section and communication terminals are electrically connected via wiring. The electronic circuit section is capable of communicating with external device via the communication terminals. Pressure information sensed by the pressure sensors is subjected to information processing by the electronic circuit section mounted on the flexible substrate before being outputted to external device using serial communication via the communication terminals provided at the flexible substrate. A large surface area can be achieved by connecting a plurality of the tactile sensor modules via the communication terminals.

Figure 1:
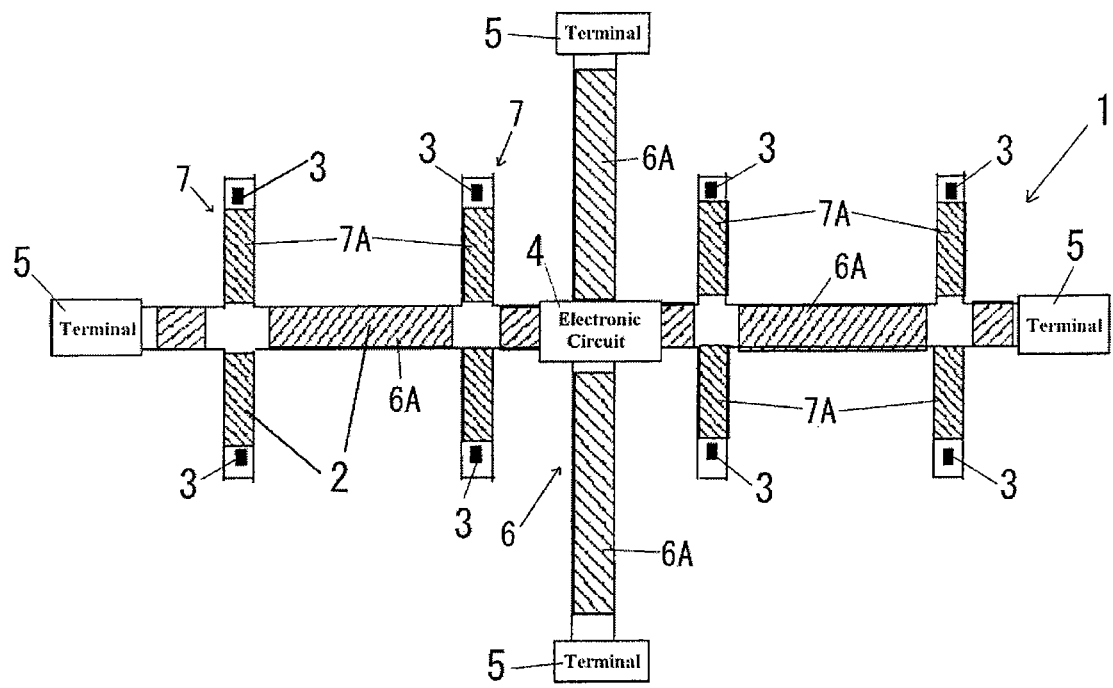
FIG. 1 is a diagram showing an overall configuration for a tactile sensor module of the present invention.

As shown in FIG. 1, a tactile sensor module 1 has a thin, flexible substrate 2 constituting the wiring substrate, a plurality of pressure sensors 3, an electronic circuit section 4, and communication terminals 5. The flexible substrate 2 is comprised of a plurality of strips. The strips constituting the flexible substrate 2 are comprised of a first strip-shaped body 6 provided with the communication terminals 5 at its ends, and a plurality of second strip-shaped bodies 7 having a proximal end coupled to the first strip-shaped body 6 and a distal end provided with a pressure sensor 3. In the example of FIG. 1, the first strip-shaped body 6 is comprised of four strips 6A and each second strip-shaped body 7 is comprised of a strip 7A. The electronic circuit section 4 is arranged at an intermediate portion of the first strip-shaped body 6. Wiring 60 electrically connecting the communication terminals 5 and the electronic circuit section 4 extends along the first strip-shaped body 6. The communication terminals 5 are serial communication terminals. Wiring 60 electrically connecting the communication terminals 5 and the electronic circuit section 4 is therefore a serial bus. Wiring 70 electrically connecting the pressure sensors 3 and the electronic circuit section 4 extends along the second strip-shaped body 7 and the first strip-shaped body 6. The electronic circuit section 4 processes electronic information indicating the quantity of pressure for each pressure sensor 3 for serial communication. The tactile sensor module 1 is provided with the communication terminals 5 for serial communication and can therefore carry out data communication with an external device (information processing apparatus that process information acquired by the tactile sensors are shown as an example) and with other modules. The amount of wiring for the strips 6A and 7A, i.e. the width of the strips 6A, 7A is decided according to the number of pressure sensors 3 handled by the electronic circuit section 4. The number of pressure sensors 3 is then decided to give the desired width. In the example of FIG. 1, the strips 6A of the first strip-shaped body 6 are formed with a broader width compared to the strips 7A of the second strip-shaped bodies 7. In the example shown in FIG. 1, the tactile sensor module 1 is configured from the first strip-shaped body 6 of an overall cross-shape, eight second strip-shaped bodies 7 coupled to the strip 6A extending in one direction of the cross-shape of the body 6 and extended vertically with respect to the strip 6A, the pressure sensor 3 provided at a distal end portion of each second strip-shaped body 7, the electronic circuit section 4 arranged at an intersection of the cross-shaped first body 6, and the serial communication terminals 5 provided at the distal ends of the first strip-shaped body 6.

Namely, the flexible substrate 2 of the present invention is of a shape comprised of a plurality of narrow strips 6A, 7A. Adapting to complex curved surfaces is therefore straightforward compared to a conventional flexible substrate that is made of an integral mass member. As no elements are mounted on the second strip-shaped bodies 7 other than the pressure sensors 3 mounted at the distal ends, this can be seen as merely a narrow elongated wiring substrate of a structure that is thin and easily folded. The first strip-shaped body 6 is also merely a narrow elongated wiring substrate where no elements are provided exclusive of distal ends provided with the communication terminals 5, the intersection (electronic circuit section 4) of the cross-shaped first strip-shaped body 6, and the intersections with the second strip-shaped bodies 7 and is therefore also of a structure that is thin and easily folded.

Figure 2:
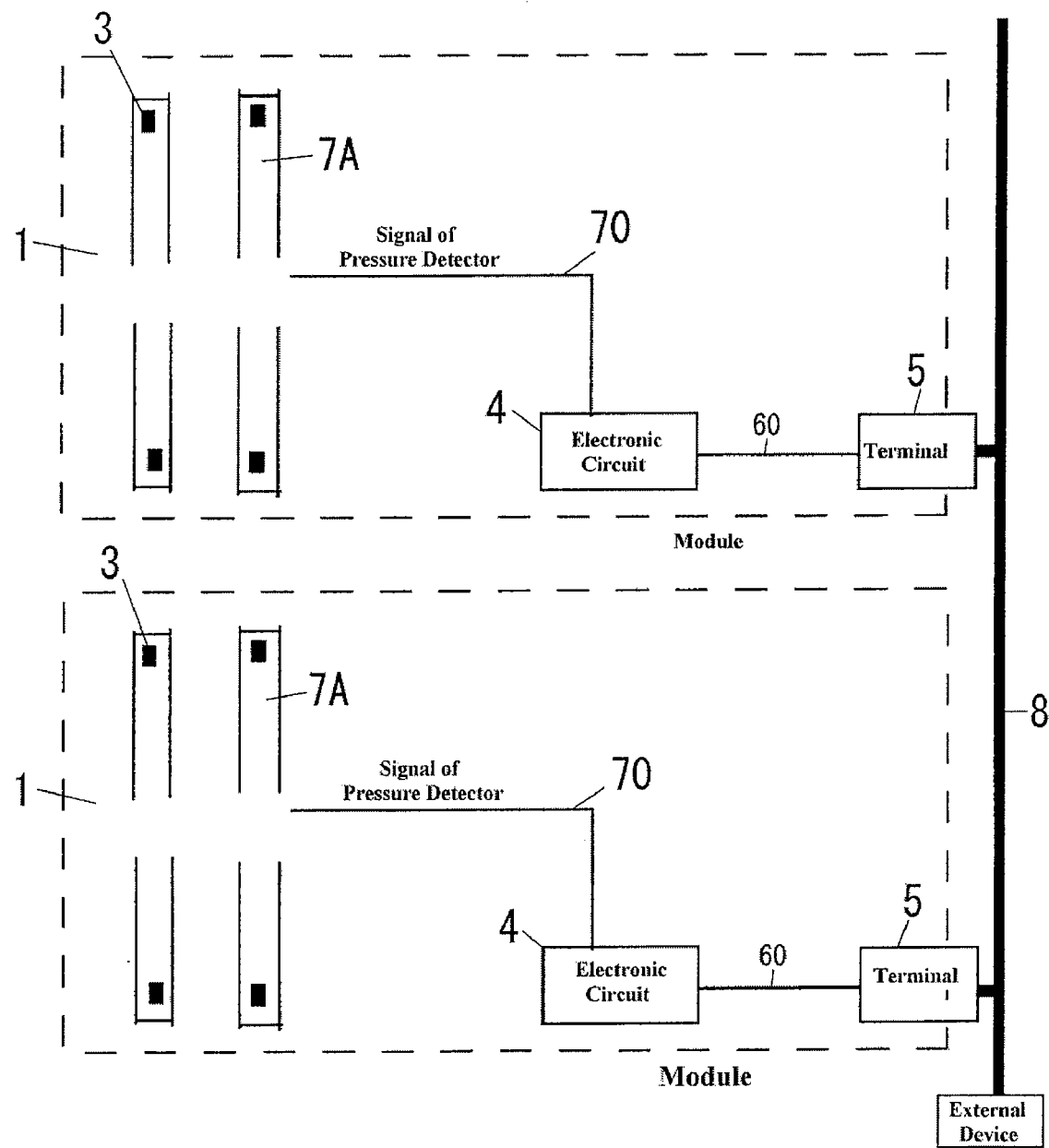
FIG. 2 is a diagram showing wiring for tactile sensor modules and connection of tactile sensor modules.

Each module 1 carries out data communication using serial communication. It is therefore straightforward to construct a tactile sensor of a larger surface area simply by connecting the communication terminals 5 for serial communication of each module 1. As shown in FIG. 2, each module 1 comprise a plurality of strips 7A, each provided with a pressure sensor 3, an electronic circuit section 4, a communication terminal 5, wiring 70 for sending signals of the pressure sensors 3 to the electronic circuit section, and wiring 60 for performing serial communication between the electronic circuit section 4 and the terminal 5. The mounting surface area of the tactile sensor can then be enlarged by connecting terminals 5 for serial communication of each module 1 via the serial wiring 8.

[B] Foldable Region

A substrate structure where each strip 6A, 7A comprises a region that can be folded is adopted for the flexible substrate 2. The oblique line regions of FIG. 1 depict foldable regions of the strips 6A, 7A. The oblique line regions are thin regions where mounted parts other than the wiring are not present that can therefore be folded. At each strip 6A, 7A constituting the flexible substrate 2, portions between the intersecting portions of the strips and the end portions are foldable regions. At the first strip-shaped body 6, portions between any two of the intersection of the first strip-shaped body 6 (the portion where the electronic circuit section 4 is provided), intersecting portions with the second strip-shaped bodies 7, and the terminals 5 constitute foldable regions. At each second strip-shaped body 7, a portion between the intersecting portion with the first strip-shaped body 6 and the distal end provided with the pressure sensor 3 constitutes foldable regions. It is then possible to adjust the installation regions for the pressure sensors 3 and arbitrarily adjust the density of the pressure sensors 3 by adjusting the folding locations and by changing the relative positions of each of the pressure sensors 3.

Figure 7:
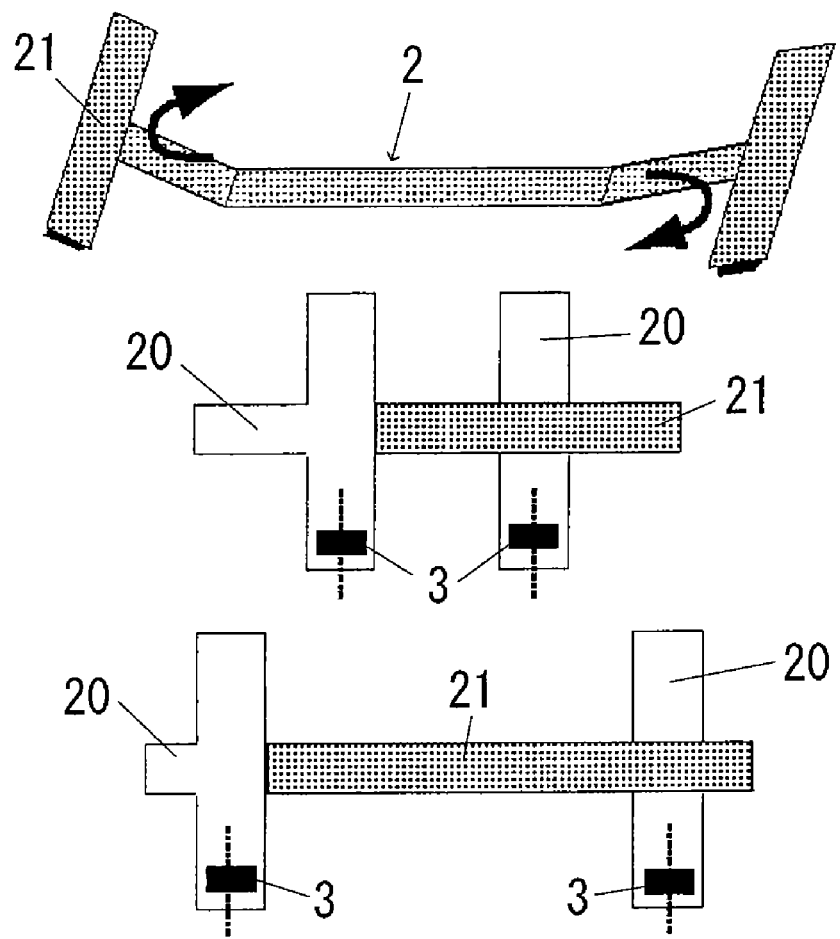
FIG. 7 is a diagram illustrating folding of strip sections having sensing elements.
Figure 8:
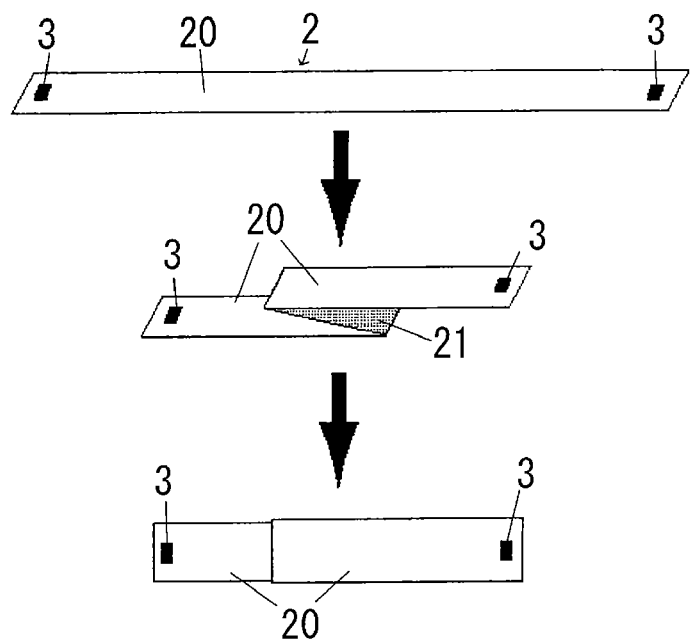
FIG. 8 is a diagram illustrating folding of strip sections having sensing elements.
Figure 9:
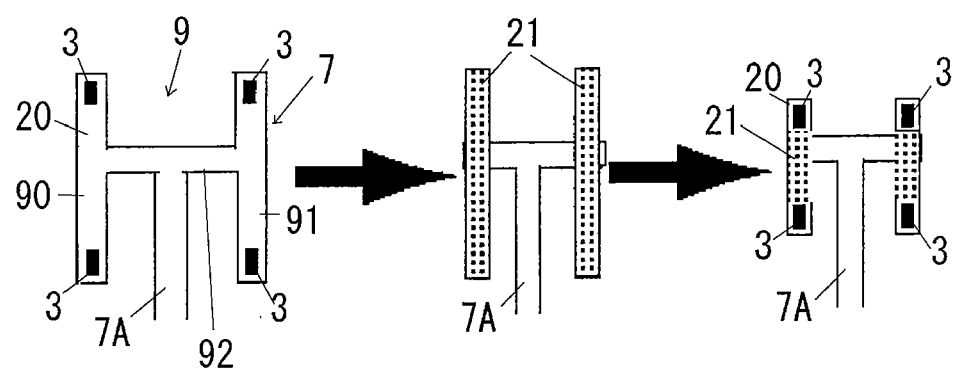
FIG. 9 is a diagram illustrating folding of an H-shaped strip section having sensing elements.

A detailed description is given based on FIG. 7 and FIG. 8 of adjusting density of the pressure sensors 3 by folding the flexible substrate 2. First, language required here is defined. A front surface 20 of the flexible substrate 2 refers to the surface where the pressure sensors 3 are mounted when manufacturing. The opposite surface is taken to be a reverse surface 21. One folding way where one or a plurality of pressure sensors 3 are folded one time in a reverse surface direction at a certain folding line, and a folding way where one or a plurality of pressure sensors 3 are folded in a direction of the front surface at a certain folding line one time, exist. The direction of the surface the pressure sensors 3 then face towards is therefore changed as a result of this one-time folding. It is therefore possible to change the orientation of the surface the pressure sensors 3 face towards and change the distance between the pressure sensors 3 at the same time by utilizing this folding. This folding is referred to as double-folding. An example of this double-folding is shown in FIG. 7.

A further typical way of folding is triple-folding. Triple-folding is a combination of double-folding in a front surface direction and double-folding in a reverse surface direction, and it is convenient to change the distance between an arbitrary two points. At this time, the direction of surface orientation of the pressure sensors 3 does not change. Use in changing of the distance between two different pressure sensors 3 or in changing of the distance between sets of pressure sensors 3 is also possible. An example of this triple-folding is shown in FIG. 8.

Further, it is possible to arrange the pressure sensors 3 in various directions by folding the direction of inclination. In this case, it is possible to arrange the pressure sensors 3 at substantially arbitrary points within a circle of a radius that is a length connecting the folding location and the pressure sensors 3 centered on the folding location.

[C] Cuttable Regions

Figure 3:
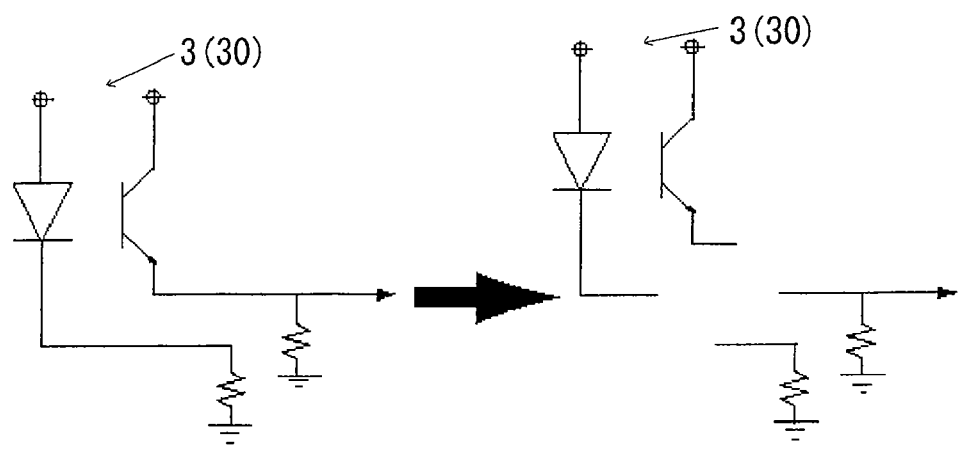
FIG. 3 is a circuit diagram of cuttable strip sections having sensing elements.
Figure 4:
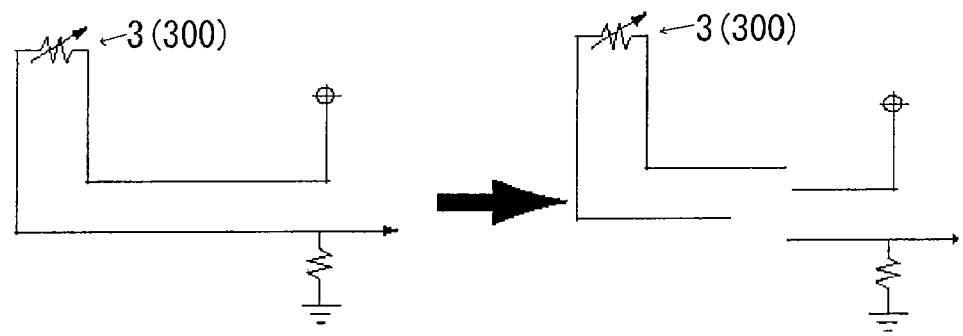
FIG. 4 is a circuit diagram of cuttable strip sections having sensing elements.
Figure 5:
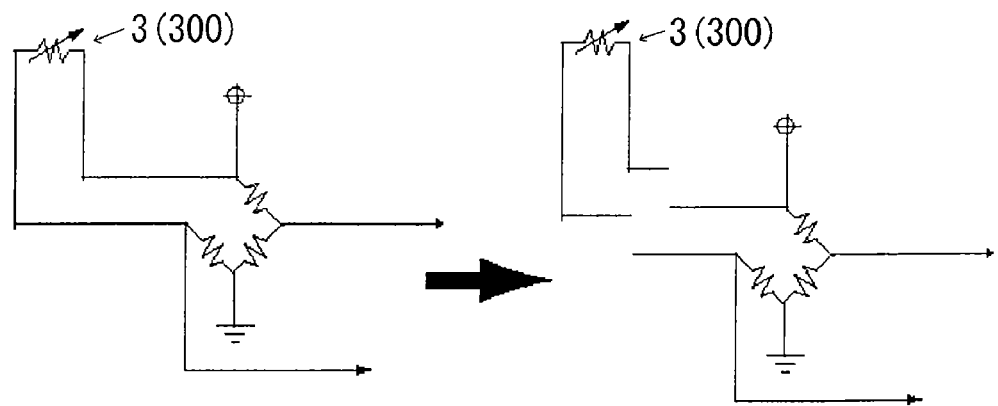
FIG. 5 is a circuit diagram of cuttable strip sections having sensing elements.

The tactile sensor module 1 comprises a circuit configuration where the strip 6A of the first strip-shaped body 6 and the strips 7A of the second strip-shaped bodies 7 are at least partially cuttable. It is therefore possible to adjust the mounting regions and to adjust the density because it is possible to reduce the number of pressure sensors 3 by cutting the strips 6A and 7A. Examples of the cuttable circuit configurations are shown in FIG. 3, FIG. 4 and FIG. 5.

A description is now given of the cuttability. It is not possible for any portions of the flexible substrate 2 to be cuttable. However, with the most of the principles of pressure sensors 3, portions where it is possible to cut-out and remove pressure sensors 3 exist. Here, the cuttability means that it is possible to cut and remove one or a plurality of pressure sensors 3 while maintaining a communication function for a sensing signal of at least one pressure sensor 3 when wires are divided at some points on the circuit diagram and a resistance between the points becomes infinite. It is possible to provide cuttable regions from a wiring substrate having cuttable wiring.

[D] Cut and Paste Mounting

Figure 21:
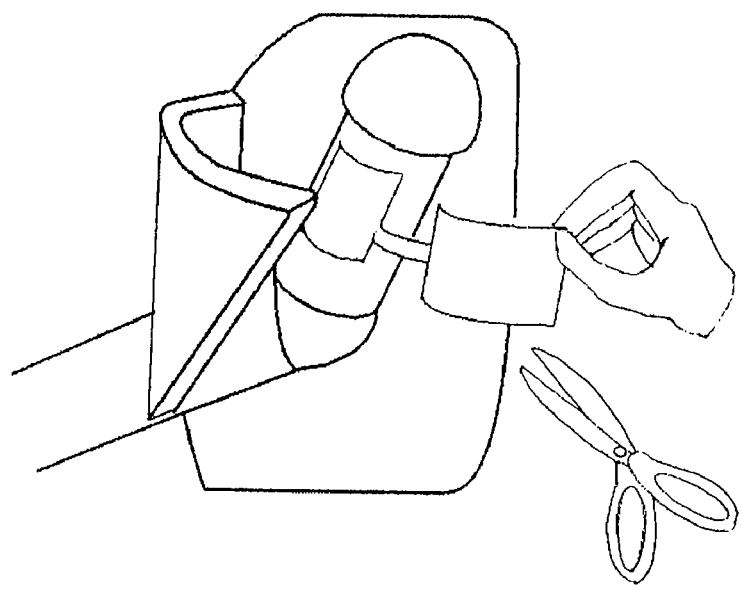
FIG. 21 is a conceptual diagram of cut and paste mounting.

A description is now given of cut-and-paste mounting of tactile sensor modules of the present invention. FIG. 21 shows a conceptual diagram of cut-and-paste mounting. "Cut-and-paste mounting" is a mounting method where "a tactile sensor module comprising a plurality of sensing elements and a communication function for transmitting sensor signals of the sensing elements using a reduced amount of wiring is taken to be a single unit, a plurality of which are then combined and mounted on a curved surface". Each tactile sensor module may function as a tactile sensor by itself but can also function when pasted together with other module. The number of sensing elements mounted on a system can then be controlled by connecting together a plurality of the tactile sensor modules. Further, it is also possible to change the installation density of the sensing elements by cutting out or by folding tactile sensor modules. It is therefore possible to cover an entire system using one type of sensor module by cutting and pasting in this manner.

[E] Sensing Elements Capable of Interpolation

A description is given of sensing elements capable of interpolation as a preferred mode for the sensing element. Whether or not the ability to interpolate exists when a plurality of sensing elements are lined up is extremely important to ensure that there are no blind portions at the tactile sensor. Interpolation is a property that can be calculated from the ratio of two detected quantities for pressure acting between two pressure sensors. It is possible to minimize blind portions by providing this characteristic at the tactile sensor. Force sensors such as pressure-sensitive resistors and capacitance-type pressure-sensitive elements etc. typically do not have the ability to interpolate due to it not being possible to discern between change of center sections and change of peripheral sections. When sensors that do not have the ability to interpolate are used, it is not possible to eliminate blind portions if the whole body is not covered with sensing elements without leaving any gaps. The sensing elements provided with the ability to interpolate disclosed in this specification can be thought of as technology established independently that are independent from the flexible substrate formed from a plurality of strips. It is therefore possible to apply sensing elements with the ability to interpolate to sheet-like tactile sensors of the related art.

Figure 18:
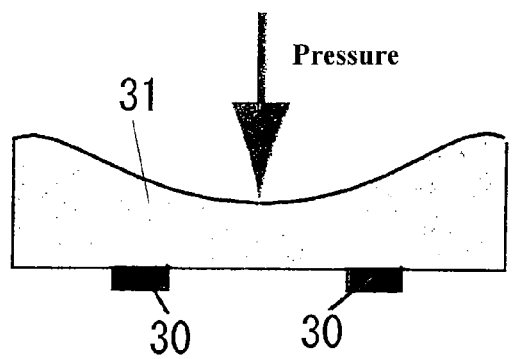
FIG. 18 is a diagram illustrating the interpolation ability of a sensing element comprised of reflective photointerrupters and urethane.
Figure 19:
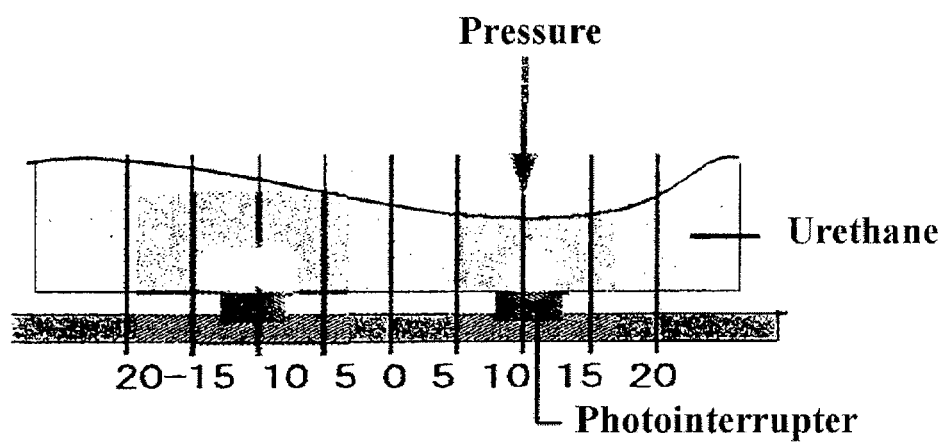
FIG. 19 is a diagram showing tests of the ability of an sensing element comprised of reflective photointerrupters and urethane to interpolate.

In a preferred mode of the present invention, a light-scattering type pressure-sensing method employing reflective photointerrupters is introduced as the pressure sensors 3 having the ability to interpolate. Changing of the pressure sensors if the density of the pressure sensors 3 is changed is not necessary when the pressure sensors 3 have the ability to interpolate because the range of the pressure sensing is broad. As shown in FIG. 18, it is possible to sense pressure of points other than for the sensing elements using change in the elastic body. As shown in FIG. 19, when the reflective photointerrupters are covered with urethane foam and a fixed load is applied around neighboring reflective photointerrupters at intervals of 5 mm, it can be confirmed that the voltage falls as the position the load is applied at approaches the reflective photointerrupters. Voltages corresponding to load at positions other than the positions of the reflective photointerrupters are then obtained and the ability to interpolate is confirmed.

Sensing elements with the ability to interpolate may be optical pressure sensors (a preferred example of which is reflective photointerrupters) having a set of a light-emitting element and a light-receiving element. Light emitted by the light-emitting element that is scattered/reflected is then received by the light-receiving element. The pressure sensors detect pressure in the following manner by covering with light-scattering elastic material (as a preferred example, urethane foam) that blocks the emitted light. Light emitted by the light-emitting element is scattered/reflected within the light-scattering elastic material and intensity distribution centering on the light-emitting unit within the light-scattering elastic material is obtained. The light-receiving elements enable a photoelectric current correlating to the intensity of light occurring at the locations where the light-receiving elements are arranged to flow and this can then be extracted as a signal. Deformation to the light-scattering elastic material is caused as a result of pressure being applied to the light-scattering elastic material and the intensity distribution of this light therefore changes. The intensity of light occurring at locations where the light-receiving elements are arranged therefore changes as a result. This is extracted as pressure information.

Figure 6:
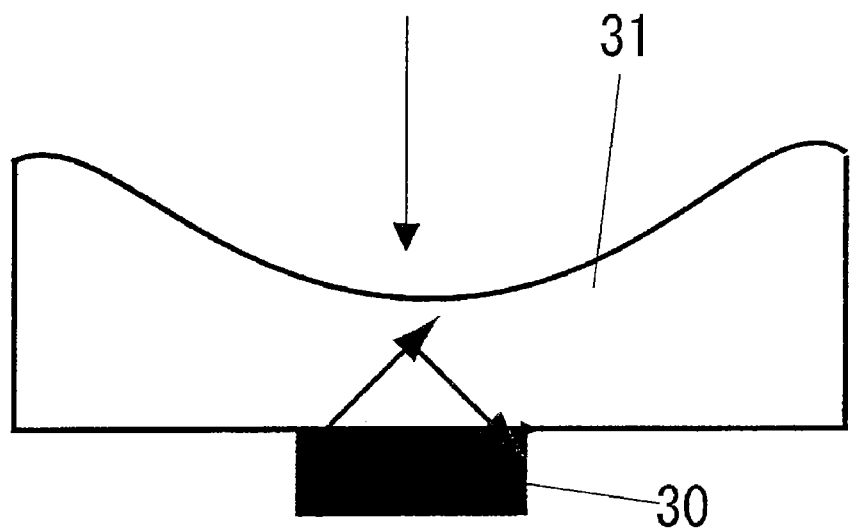
FIG. 6 is a diagram showing a sensing element comprised of a reflective photointerrupters and urethane.

As shown in FIG. 6, a structure is adopted where urethane foam 31 is mounted on the upper surface of the flexible substrate 2 provided with a reflective photointerrupter 30. The reflective photointerrupter 30 is comprised of a light-emitting unit of an LED, etc., and a light-receiving unit of a phototransistor, etc., light from the light-emitting unit is scattered/reflected at the urethane foam 31, and the intensity of the reflected light is measured at the light-receiving unit. When subjected to pressure, the amount of light for the light-receiving unit changes as a result of deformation and changes in density of the urethane foam 31 and the amount of pressure can be detected. More specifically, light radiated within the urethane foam 31 from the LED portion of the reflective photointerrupter 30 is scattered within the urethane foam. At this time, when a load is applied to the urethane foam 31, a region for light scattering changes due to the characteristics of the urethane foam. The amount of light reaching the light-receiving unit of the reflective photointerrupter 30 therefore changes. The characteristic of the urethane foam is the property that light-scattering regions of the urethane foam compress when weight is applied to the surface of the urethane foam. Namely, it is possible to obtain the weight applied to the surface of the urethane foam by measuring the amount of light received. In addition, the ability to interpolate is brought about by using an elastic body referred to as urethane foam. It is also possible to change sensor characteristics by selecting the properties of the urethane foam. The tactile sensor of the present invention is configured by arranging micro reflective photointerrupters on the flexible substrate and for bonding to urethane foam from above. Implementation is therefore straightforward compared to optical fiber methods. The micro surface-mountable reflective photointerrupter 30 can be purchased at a low price and implementation of small, low-cost sensors that is difficult with optical fiber methods is possible.

Figure 17:
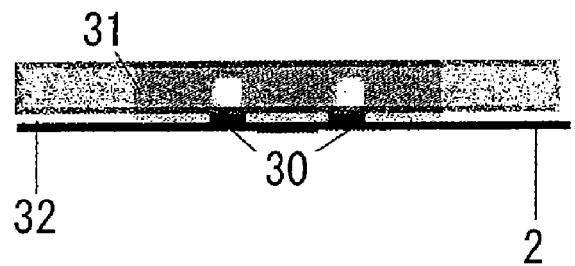
FIG. 17 is a diagram showing a flexible substrate provided with a sensing element comprised of reflective photointerrupters and urethane.

The extent of scattering and reflection of the urethane foam as a result of pressure changes according to the hardness and density etc. of the urethane foam 31. It is therefore possible to easily adjust the sensitivity by changing the urethane foam. Moreover, it is also possible to broaden the gaps between the pressure sensors 3 and lower the density as a result of there being the ability to interpolate. Ability to adapt to curved surfaces is also increased because the structure of the flexible substrate 2 also does not become dense. Cost and reliability can also be improved because the total number of pressure sensors 3 overall is reduced. Moreover, as shown in FIG. 17, the urethane foam 31 covers the top of the flexible substrate 2. This function therefore protects the reflective photointerrupter 30 and the electronic circuit section 4. The surface-mounted reflective photointerrupter 30 can also be automatically mounted on the flexible substrate 2, which makes automatic manufacture straightforward.

Further, when the reflective photointerrupter 30 is used, and when the time sharing control disclosed in patent document 2 is introduced for the electronic circuit section 4, the number of wires within the module 1 can be substantially reduced. This is based on the theory where it is possible to measure outputs of individual phototransistors independently by utilizing the fact that the phototransistors are current output, and that each LED can be made to generate light independently while the outputs of a plurality of phototransistors share one item of wiring. It is therefore possible to make the widths of the strips 6A, 7A narrower by reducing the wiring within the module 1. In patent document 2, a tactile sensor using reflective photointerrupters is disclosed where, when LEDs for the reflective photointerrupters are lined up in series and the phototransistors in parallel so as to constitute a matrix shape, it is possible to reduce the amount of wiring by using time sharing control. The time share control used here is time-sharing control as its broader term as used in patent document 2. Specifically, with regards to limits placed on the driving of the LEDs in series in patent document 2, here, the LEDs may be driven in parallel or in series. Further, according to patent document 2, a circuit is adopted where reflective photointerrupters are arranged at all of the lattice points of a matrix, but here the reflective photointerrupters may be arranged at some or all of the lattice points of a matrix.

First Embodiment

[F] H-Shaped Strip Section
[F-1] Overall Configuration of Tactile Sensor Module

A description is now given based mainly on FIG. 9 to FIG. 14 of a first embodiment. In the first embodiment, the pressure sensors 3 are provided at strip-shaped body configured from a strip-shaped base section and a plurality of branched strips formed integrally at a distal end of the strip-shaped base section. Specifically, the distal end of the second strip-shaped body 7 is configured from an H-shaped section 9 comprised of a plurality of branched strips. Namely, the second strip-shaped body 7 is comprised of the strip 7A as the strip-shaped base section and the H-shaped section integrally provided at the distal end of the strip 7A. The proximal end of the strip 7A is connected to the strip 6A of the first strip-shaped body 6. The H-shaped section 9 is comprised of two strip-shaped sensing element mounting portions 90, 91 and a strip-shaped connecting portion connecting intermediate portions of two strip-shaped sensing element mounting portions 90, 91. The two strip-shaped sensing element mounting portions 90, 91 extend perpendicularly to the strip 6A to which the strip 7A is connected, and the strip-shaped connecting portion 92 extends in parallel to the strip 6A of the first strip-shaped body 6. Respective pressure sensors 3 are provided at the both end portions in a lengthwise direction (distal end portions) of strip-shaped sensing element mounting portions (branched strips) 90, 91. The tactile sensor module 1 of this embodiment adopts the so-called light-scattering type pressure-sensing method. The pressure sensing means is therefore comprised of the reflective photointerrupter 30 taken as the pressure sensors 3 and the urethane foam 31 taken as the light-scattering elastic material.

The H-shaped strip section 9 is configured from the thin flexible substrate 2 so as to be bendable. One pressure sensor 3 is then installed at each of the four corners of the H-shaped strip section 9. By providing the pressure sensors 3 at the H-shaped strip section 9, it is possible to adjust the distances between the four pressure sensors 3. It is then possible to construct one tactile sensor module 1 by lining up a plurality of such H-shaped pressure sensing sections.

Figure 10:
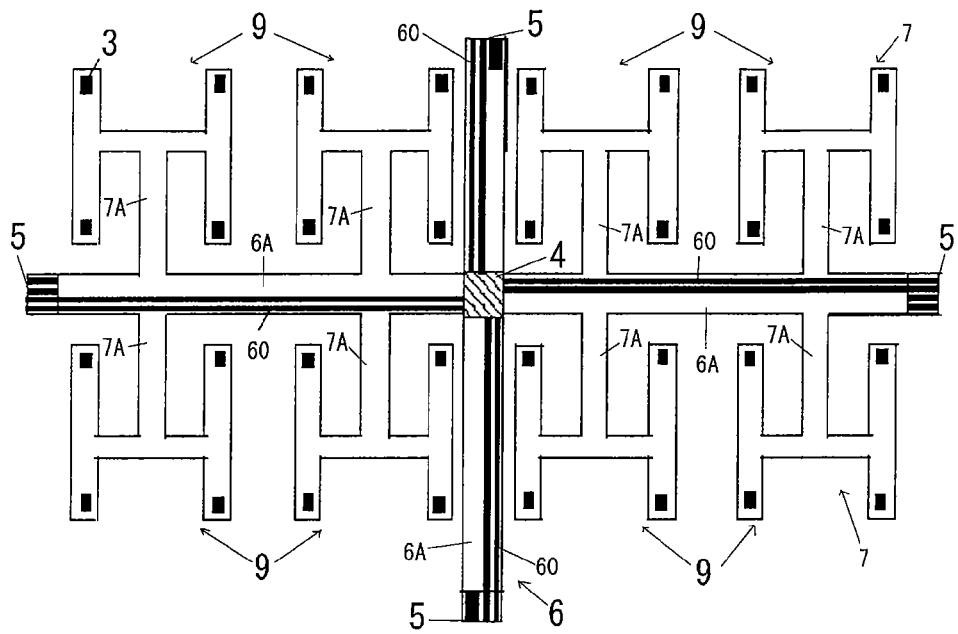
FIG. 10 is a diagram showing an overall configuration for a tactile sensor module provided with H-shaped strip sections having sensing elements.

An example of a tactile sensor module 1 comprised of thirty-two pressure sensors 3 where eight H-shaped strip sections 9 are lined up is shown in FIG. 10. The tactile sensor module 1 shown in FIG. 10 is comprised of the first strip-shaped body 6 that has an overall cross-shape, the electronic circuit section 4 arranged at an intersecting portion of the first strip-shaped body 6, and serial communication terminals 5 provided at distal ends of the first strip-shaped body 6. The eight second strip-shaped bodies 7 are coupled to the strips 6A extending in one direction of the cross-shaped first strip-shaped body 6. H-shaped strip sections 9 are formed integrally at the distal ends of the strips 7A constituting the strip-shaped base sections of each of second strip-shaped bodies 7. Four pressure sensors 3 are provided at the four corners of the H-shaped strip section 9.

The outputs of the sensors of the reflective photointerrupters 30 are converted using an analog-digital converter of the electronic circuit section 4 and passed over to the processor of the electronic circuit section 4. The processor puts the digitally converted sensor values into the form for serial communication and performs data communication with an external device via the serial communication terminals 5. The serial communication is carried out by either (or a plurality) of the signal lines in four directions outputted from the processor. The second strip-shaped bodies 7 including the H-type strip sections 9 the pressure sensors 3 are mounted on do not have a serial communication path. Wiring 60 extends in the shape of a cross at the cross-shaped first strip-shaped body 6. The electronic circuit section 4 is arranged at the intersecting section at the center and the serial communication terminals 5 are mounted at the distal ends of the first strip-shaped body 6. It is possible to make the surface area of the mounting region for the tactile sensor larger surface area by connecting together a plurality of tactile sensor modules 1 constructed in this way.

[F-2] Foldable Regions

A description is now given of the configuration for the flexible substrate and of the foldable regions. In one embodiment, the flexible substrate is made from a coverlay, a base, copper foil, plating, and an adhesive. Regarding configurations for the flexible substrate, a single surface wiring substrate having wiring on just one side of the substrate and a double-sided wiring substrate having wiring on both sides of the substrate exist. In one mode, the thickness of the flexible substrate is coverlay+adhesive: 12+15=27 μm, the base: 25 μm, the copper foil+plating: 12+10=22 μm, that with a one-sided wiring substrate gives 25+22+27=74 μm, and with a double-sided wiring substrate gives 74+22+27=123. The thickness and material of the flexible substrate depends on the substrate but single-sided wiring substrate is advantageous for the foldable regions. It is also desirable to provide the coverlay on just one side. The through-holes and plating that cannot be folded are positioned at portions other than the foldable regions. Portions other than the foldable regions (including sensing element mounting sections, portions where items other than wiring are mounted, and mounting portions for communication terminals and processor units etc.) can be made of double-sided wiring substrate.

According to the tactile sensor module of the first embodiment, portions with the wiring only other than portions where electronic elements (all mounted parts such as reflective photointerrupters taken as pressure sensors, a processor of an electronic circuit section, resistors, capacitors, and communication terminals) are mounted are foldable regions. Namely, according to the tactile sensor module of the first embodiment, the second strip-shaped body 7 (the strip 7A constituting the strip-shaped base section and the H-shaped strip section 9 formed integrally at the distal end of the strip 7A) is a foldable region with the exception of the portions for mounting the pressure sensors 3. The first strip-shaped body 6 is a foldable region with the exception of the electronic circuit section and the communication terminals. The H-shaped section 9 can be folded as shown in the right part of FIG. 9. Namely, the distance between each pressure sensor 3 can be made smaller by folding the two strip-shaped sensing element mounting sections 90, 91 at both ends of the connecting section 92 from the front surface 20 to the reverse surface 21, followed by folding the end portions of sensing element mounting sections 90, 91 with the pressure sensors 3 facing the reverse surface from the front surface 20 towards the reverse surface 21. Further, it is possible to change the relative positions of the pressure sensors 3 at the foldable regions by triple-folding. It is also possible to change the lengths of the first strip-shaped body 6 and the strips 7A of the second strip-shaped bodies 7 at the regions other than the electronic element mounting portions in a manner shown in FIG. 8

[F-3] Cuttable Region

Figure 11:
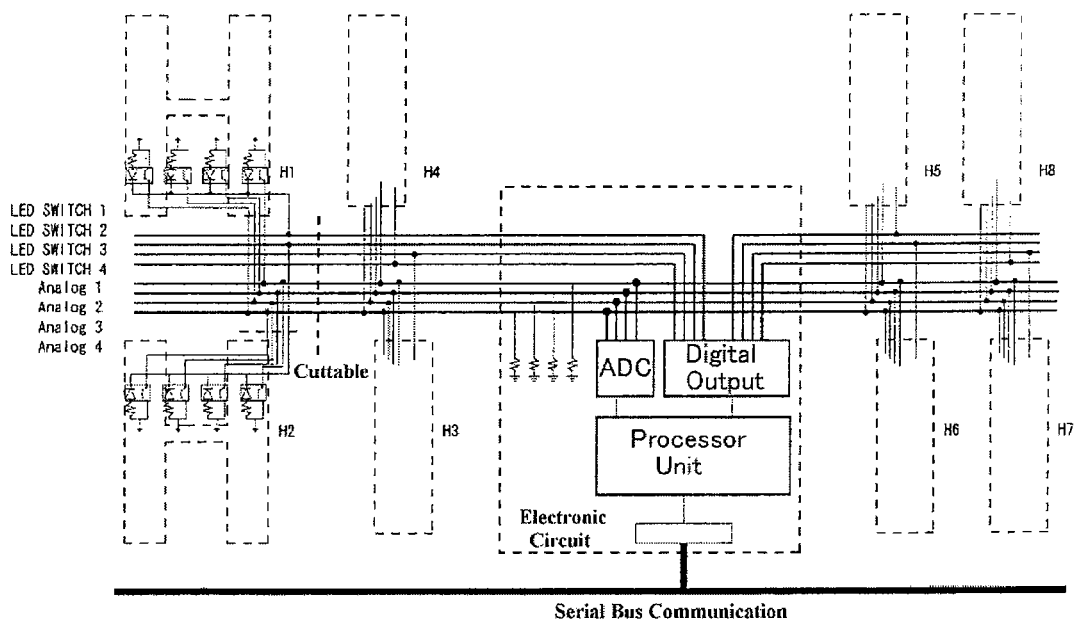
FIG. 11 is a diagram showing a circuit configuration for the tactile sensor module shown in FIG. 10.
Figure 12:
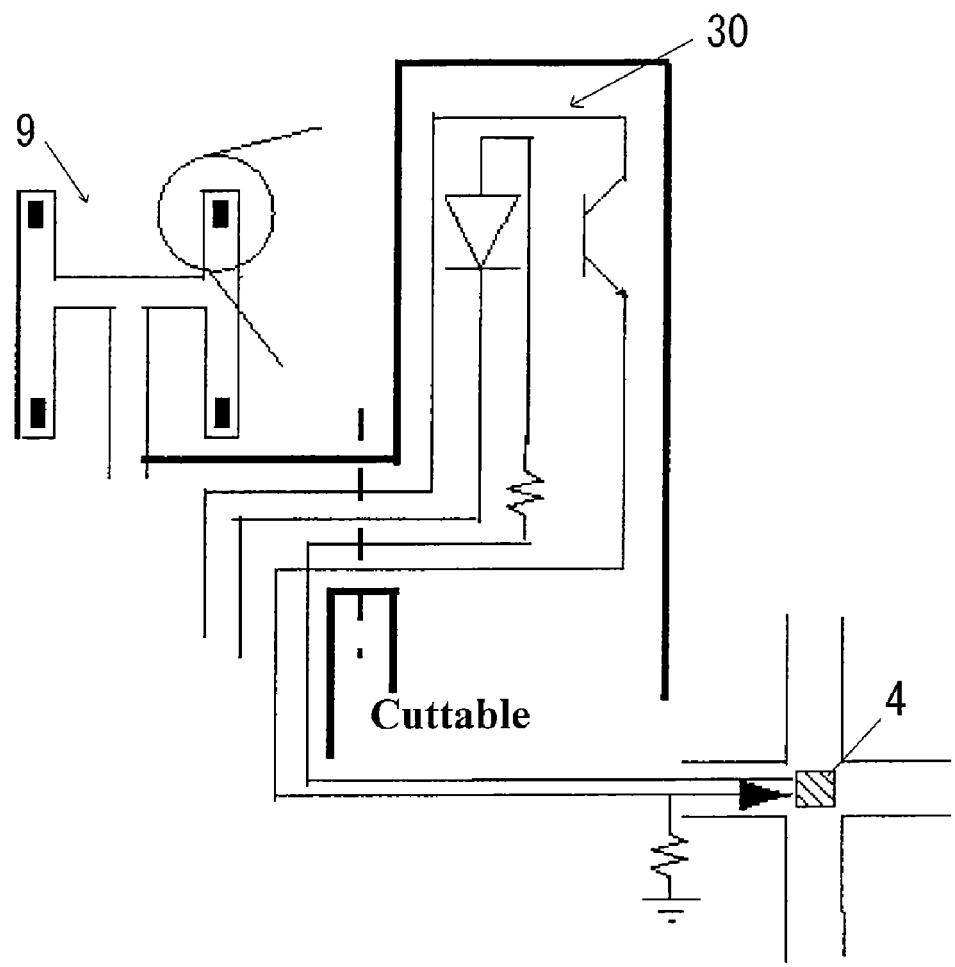
FIG. 12 is a circuit diagram of a cuttable H-shaped strip section having sensing elements.
Figure 13:
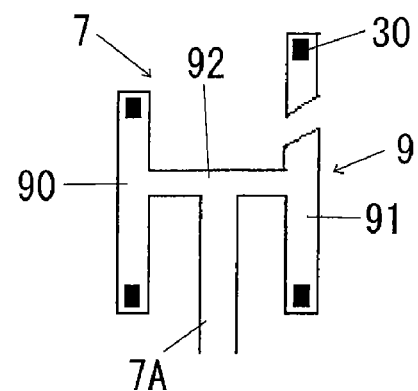
FIG. 13 is a diagram showing an example of cutting an H-shaped strip section having sensing elements.
Figure 14:
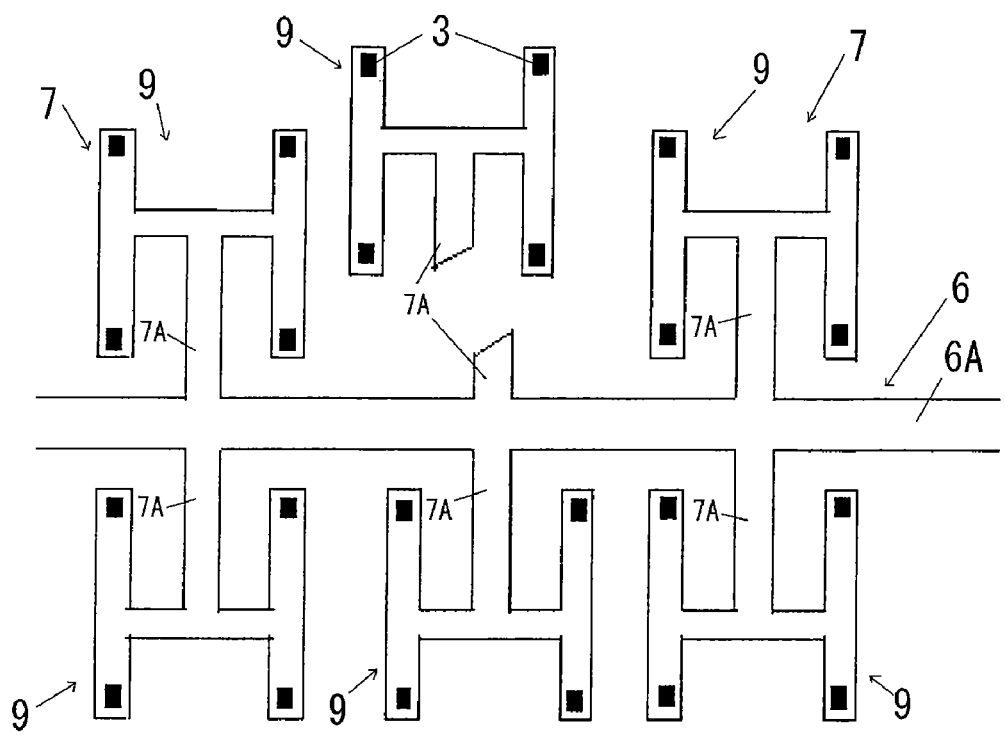
FIG. 14 is a diagram showing an example of cutting an H-shaped strip section having sensing elements.

The circuit is configured such that it is possible to cut the substrate at the strip portion. FIG. 3 shows a circuit diagram of an example for the case of sensing pressure using the reflective photointerrupter 30, and shows the cutting points in the event of cutting. The left side of the arrow shows before cutting, and the right side of the arrow shows after cutting. The change in impedance of the signal lines for sensor output after cutting can be ignored, and the voltage becomes 0V. In this case, it is possible to cut the pressure sensors 3 (reflective photointerrupters 30) without influencing other portions. It is therefore possible to configure a cuttable flexible substrate by configuring the H-shaped portion as shown in FIG. 12. Examples of cuttable portions are also shown in FIG. 11. FIG. 11 shows the case of cutting the first strip-shaped body 6. FIG. 13 shows the case of cutting out part of the sensing element installation section 91 of the H-shaped strip portion 9 so as to cut out the single reflective photointerrupter. FIG. 14 shows the case of collectively cutting out a plurality of reflective photointerrupter 30 by cutting out the H-shaped strip portion 9 and the strip 7A of the second strip-shaped body 7 coupled to the first strip-shaped body 6.

[F-4] Light-Scattering Type Pressure-Sensing Method

The tactile sensor module 1 of this embodiment adopts the so-called light-scattering type pressure-sensing method and the pressure detecting means is comprised of the reflective photointerrupter 30 and the urethane foam 31. As shown in FIG. 17, this is made by having the reflective photointerrupter 30 lined up facing along a normal direction on a plane, with the urethane foam 31 then being adhered on top. A transparent epoxy resin is then used as the adhesive layer 32. This is then adopted as a pressure sensor by utilizing the fact that the proportion of light reaching the light-receiving elements (phototransistor sections or photodiode sections) of the light emitted from the light-emitting element (LED section) of the reflective photointerrupter 30 changes depending on the load.

The basic theory of the light-scattering type pressure-sensing method is disclosed in patent document 1 and patent document 1 can be referred to for the details of the basic theory. The feature when this theory is employed is the presence of the ability to interpolate. The ability to interpolate is the property that it is possible to calculate the pressure acting between two pressure sensors from the ratio of two sensed amounts. The sensor of this embodiment is characterized by a structure that does not employ optical fibers with the purpose of improvement of the mounting surface. The pressure sensor of patent document 1 is configured from a sensor that measures density of scattered/reflected light by preparing and then mounting in a lined up manner optical fibers for light-emitting use and optical fibers for detector use. The pressure sensors of patent document 1 have problems with durability because optical fibers are used and handling is difficult. There is also the problem that the optical fibers are collected together at the light-emitting elements and light-receiving elements which are connected to the optical fibers and the interface portion therefore becomes extremely large. In this embodiment, manufacture and mounting is straightforward because the optical fibers are eliminated and replaced with reflective photointerrupters.

It is also possible to construct micro pressure sensors by utilizing reflective photointerrupters 30 as the pressure sensors 3. The reflective photointerrupter (SHARP GP2S60) adopted in this embodiment is 3.2 mm×1.7 mm×1.1 mm in size. Further, the sensors utilize deformation of urethane foam and therefore are capable of interpolation. Moreover, the urethane foam is foaming material and is therefore lightweight compared to rubber etc. The weight of the reflective photointerrupters is less than 0.1 g each.

It is also possible to obtain various response characteristics by changing the type of urethane foam mounted on the reflective photointerrupter. For example, it is possible to obtain a response characteristic that is non-linear where the voltage drops substantially with respect to the initial weight and the changes only slightly thereafter. This kind of response characteristic is then different depending on the type of urethane foam. It is therefore possible to adjust the sensitivity and dynamic range depending on the portion on which the module is mounted by changing the type of urethane foam.

A sensor using a reflective photointerrupter has the problem that the current consumed is substantial. It is possible to limit the number of LEDs through which current is flowing by using a microcontroller to perform time sharing control as explained in the following in order to reduce the amount of current flowing in the LEDs of the reflective photointerrupter. The overall current consumed can therefore be reduced as a result.

The amount of current flowing in individual LEDs can be subjected to PWM control. It is therefore possible to change the sensitivity and dynamic range of the sensors by controlling the amount of current flowing in the LEDs. Further, it is possible to reduce variation between sensing elements. The amount of current flowing through the LEDs is controlled by generating a PWM signal from a microcontroller used in control of the number of LEDs current is flowing through.

[F-5] Time Sharing Control

Figure 20:
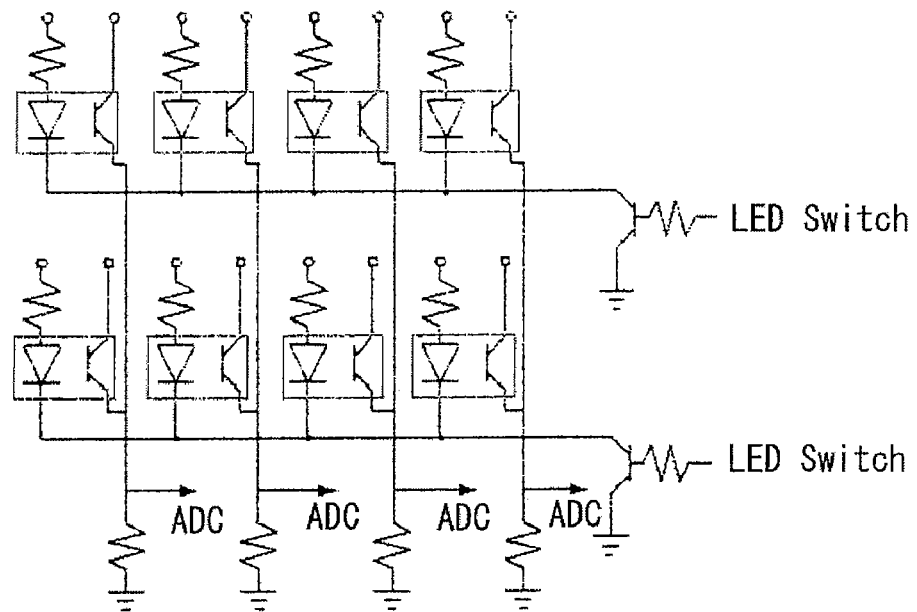
FIG. 20 is a circuit diagram of time sharing control occurring in control of LEDs for photointerrupters.

A block circuit diagram is shown in FIG. 11. The power supply is omitted. There is a total of eight H-shaped portions shown respectively as H1 to H8. It is possible to control the respective LEDs to go ON and OFF using Digital Output and the signal lines are represented by LED SWITCH1 to LED SWITCH8. The analog signals are shared by H1 to H8 with Analog 1 to Analog 4 being provided to H1 to H8. When all of the LEDs are not being driven, the photoelectric current flowing at the phototransistors is only dark current and the voltages of all of the analog signal lines from Analog 1 to Analog 4 do not change due to pressure. Just the control circuit for an LED is shown in FIG. 20.

When all of the LEDs for H1 are turned ON by the LED SWITCH 1, photoelectric current flows in the phototransistor for H1. It is then possible to read out changes in pressure for the section H1. When the LED SWITCH1 is put OFF and the LED SWITCH 2 is put ON, current flows only at the LED for H2. Signals that it is possible to read out from the signals for Analog 1 to Analog 4 are then only for the pressure applied to the section H2. It is then possible to read out changes in pressure for the respective sensor sections using common analog wiring by subjecting the LEDs of the H-shaped portion to time sharing control. It can therefore be understood that just twelve signal lines are sufficient in this method compared to the thirty-two signal lines that are required when signals from the phototransistors are processed individually.

[F-6] Communication Functions

It is possible to distribute the wiring and omit wiring by putting sensor signals obtained by the pressure sensors 3 into digital form locally using the electronic circuit section and performing transmission using serial communication. A small-sized microcomputer 8051 (Silicon Laboratories) is used as the microprocessor unit for the electronic circuit section. This microcomputer is in a compact package 4 mm square and is provided with an oscillator, AD converter, and serial communication function. It is therefore possible to implement a communication function in limited space. It is possible to use an SMBus in serial communication and this is also used in this embodiment.

The tactile sensor modules are all configured as SMBus slaves having five bit addresses. It is therefore possible to connect a maximum of thirty-two ($2^5$) tactile sensor modules to one SMBus. This means that it is possible to read out 32 (8×4) sensor signals because the respective tactile sensor modules have eight channels of LED switches and are capable of obtaining four sensing signals for the respective channels. It is then possible to obtain 8 bit AD converted values for four sensors by specifying a total of 8 bits of five bits of node ID and three bits of LED SWITCH channel from the SMBus master.

[F-7] Example

A description is now given of experimental examples of small-size tactile sensors employing the reflective photointerrupters and urethane shown in the first embodiment. A tactile sensor module is designed, and experiments are carried out regarding sensor functions, communication functions, and functions for connecting between modules. The tactile sensor module comprises thirty-two tactile sensing elements, an electronic circuit section of an 8051 microcomputer (Silicon Laboratories), and a communication terminal capable of connecting the modules. These elements are provided on single flexible substrate such that the module can function by itself as well as function when a plurality of modules are connected together. Four AD converters are prepared for the thirty-two tactile sensing elements and are shared by each eight channels of tactile sensing elements. The four AD converters and the eight channels of LED switches are implemented within a microcontroller. Excellent results are then obtained with regards to reducing the number of wires, reducing the number of microcontroller ports, and for downsizing as a result of utilizing the time sharing control explained above. Connection of the modules is carried out by connecting the communication terminals using an ACF connection method.

The characteristics of the light-scattering type pressure-sensing method are measured by affixing POLYOLEFIN FOAM P E-LITE A-8 on the reflective photointerrupters mounted on the tactile sensor modules. Reduction of the output voltage according to load can be confirmed as a response characteristic. It is possible to achieve both wide dynamic range and high sensitivity by adopting a non-linear characteristic where voltage falls substantially for initial loads and then changing only slightly thereafter. Further, hysteresis can also be confirmed because urethane foam is employed. These characteristics can be adjusted using types of urethane foam. Namely, it is possible to change the sensitivity and dynamic range depending on the portions on which the sensor module is mounted. The extent of the hysteresis also changes according to the type of urethane foam.

A plurality of tactile sensor modules were then connected and mounted on a leg of a humanoid. The combined tactile sensors then have 128 points of contact and weigh 58 g. Of this weight, 40 g is the tactile sensor module, and 18 g is the urethane. The tactile sensor module is connected by an ACF connection method. The tactile sensor modules can then be stuck onto a humanoid while changing the mounting density of the sensors using mounting portions while appropriately folding the tactile sensor modules or while cutting out unnecessary portions of the sensor modules.

The communication function is then confirmed. The communication speed at which communication was possible on the SMBus network configured using thirty-two SMBus slaves was measured at below 1 MBps. The sum of the time taken for communication and the time up to the sensing values stabilizing after LED switching was approximately 0.2 msec.

The above is a description of a first embodiment that is a preferred mode for the present invention. The first embodiment relates to small-sized tactile sensors employing reflective photointerrupters and urethane foam. The feature of this sensor is that it can be easily made with a straightforward structure. Further, it is possible to control characteristics using the type of urethane foam. The downsizing is convenient for the case mounting of a number of sensors. Due to the ability to interpolate, the number of sensing elements can be reduced while eliminating insensible zones. Power consumption can be a problem. In this regard, it is shown that the current consumed can be reduced using LED switching. Further, it is proposed to utilize LED switching, share wiring and AD converters, and control the amount of current flowing in the LEDs using PWM. Tactile sensor modules are made by providing a plurality of sensing elements and a network function on a flexible substrate, and tactile sensor modules are then connected and mounted through cut-and-paste. At this time, mounting on an arbitrary curved surface is possible as a result of adjusting of mounting density of the sensing elements and of mounting regions by appropriately cutting strip sections of the flexible substrate or by folding one or plurality of sensing elements. Further, the number of sensing elements mounted and the mounting regions can be freely adjusted by connecting together a plurality of tactile sensor modules. It is then possible to change the sensor installation density by folding the substrate.

Second Embodiment

Figure 15A:
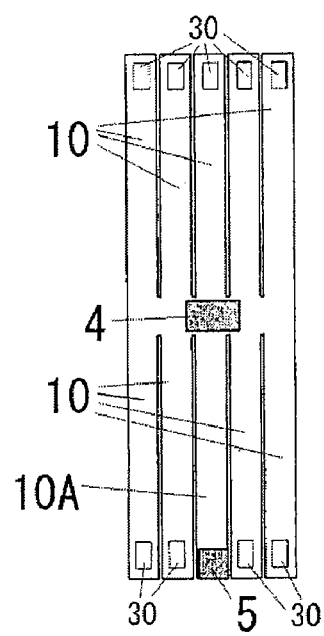
FIG. 15A is a diagram showing a strip section of a further embodiment having sensing elements.
Figure 15B:
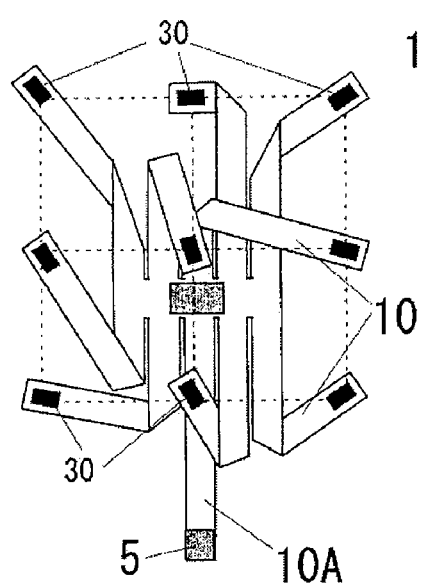
FIG. 15B is a diagram showing a strip section of a further embodiment having sensing elements.
Figure 15C:
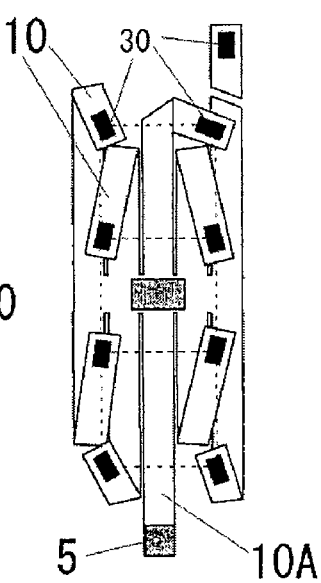
FIG. 15C is a diagram showing a strip section of a further embodiment having sensing elements.

[G] Flexible Substrate with a High Degree of Freedom of Arrangement for the Sensing Elements An example of changing the substrate shape of the first embodiment is shown. The flexible substrate of the second embodiment is configured from a star structure where a number of strips are coupled together at the base end side. As shown in FIG. 15A, a rectangular flexible substrate is cut vertically in eight places so as to give ten strips, at the center of which the electronic circuit section 4 is located. A communication terminal 5 is provided at a strip 10A at the lower side of the center, with photointerrupters then being arranged at the end portions of the other nine strips 10. By then just folding each strip once in the middle portion, it is possible to arrange the reflective photointerrupters 30 at substantially arbitrary positions within a region on the inside of a circle of a radius of a dimension between the base end sections (bases of the cuts) of the strips 10 and the distal end sections (photointerrupters 30) of the strips. It is therefore possible to configure arrangements for various patterns from one flexible substrate 2 as shown in FIG. 15B and FIG. 15C. In FIG. 15C, the strips 10 are cut at the upper part of the right side, the number of photointerrupters 30 is taken to be 8, and the number is adjusted. In FIG. 15A, the reflective photointerrupters 30 are mounted on the reverse side of the strips 10 and the strips 10 are folded so as to give the reverse sides shown in FIG. 15B and FIG. 15C. The flexible substrate of the second embodiment can be constructed easily simply by making cuts in the rectangular substrate. This enables costs to be reduced.

Third Embodiment

[H] Pressure-Sensitive Resistor taken as a Pressure Sensor

Figure 16:
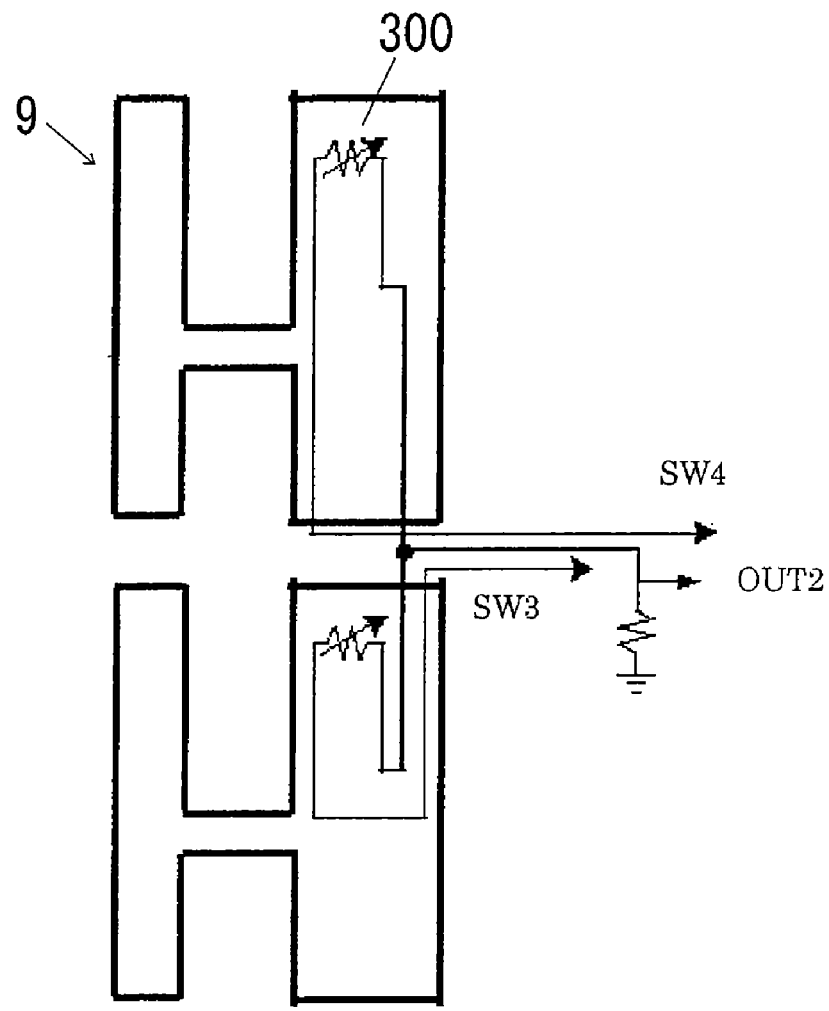
FIG. 16 is a circuit diagram of a sensing element comprised of pressure-sensitive resistors.

In the first embodiment, the pressure sensors 3 are constructed from reflective photointerrupters 30 but it is also possible to make the pressure sensors 3 from pressure-sensitive resistors. In this case, changing of the installation density is not appropriate because there is no ability to interpolate. As shown in FIG. 16, it is possible to carry out time-sharing control in the same way as for reflective photointerrupters. It is possible to independently read out output signals of pressure-sensitive resistors 300 by applying power supply voltages to SW 3 and SW4 or by providing high impedances.

It is also possible to make the width of the strips as narrow as possible by reducing the wiring using time sharing control when the pressure-sensitive resistors 300 are employed. Cutting at the strips is also possible. A circuit diagram and cutting points are shown for the case of using the pressure-sensitive resistors 300 in FIG. 4 and FIG. 5. The left side of the drawing shows the circuit diagram before cutting, and the right side of the drawing shows the circuit diagram after cutting. In FIG. 16, the cuttable regions are implemented within the strip regions and cuttable strips can therefore be implemented.

Fourth Embodiment

[I] Strip with a Rectangular Wide Portion

A rectangular wide section 900 is formed integrally at the distal end of the strip 7A constituting the strip-shaped base section of the second strip-shaped body 7, in place of the H-shaped strip section of the first embodiment. Reflective photointerrupters 30 are provided at the four corners of the rectangular wide sections 900. It is then possible to adjust the density of the reflective photointerrupters 30 by folding the strips 7A of the second strip-shaped bodies 7. Further, it is possible to cut-out the wide rectangular sections having reflective photointerrupters by cutting out strip sections 7A constituting base sections of the second strip-shaped bodies. Two SMBus wires and two power supply wires then extend in four directions and a plurality of tactile sensor modules are connected together by connecting the communication terminals. It is also possible to cut the communications line in directions where connection does not take place.

Figure 22:
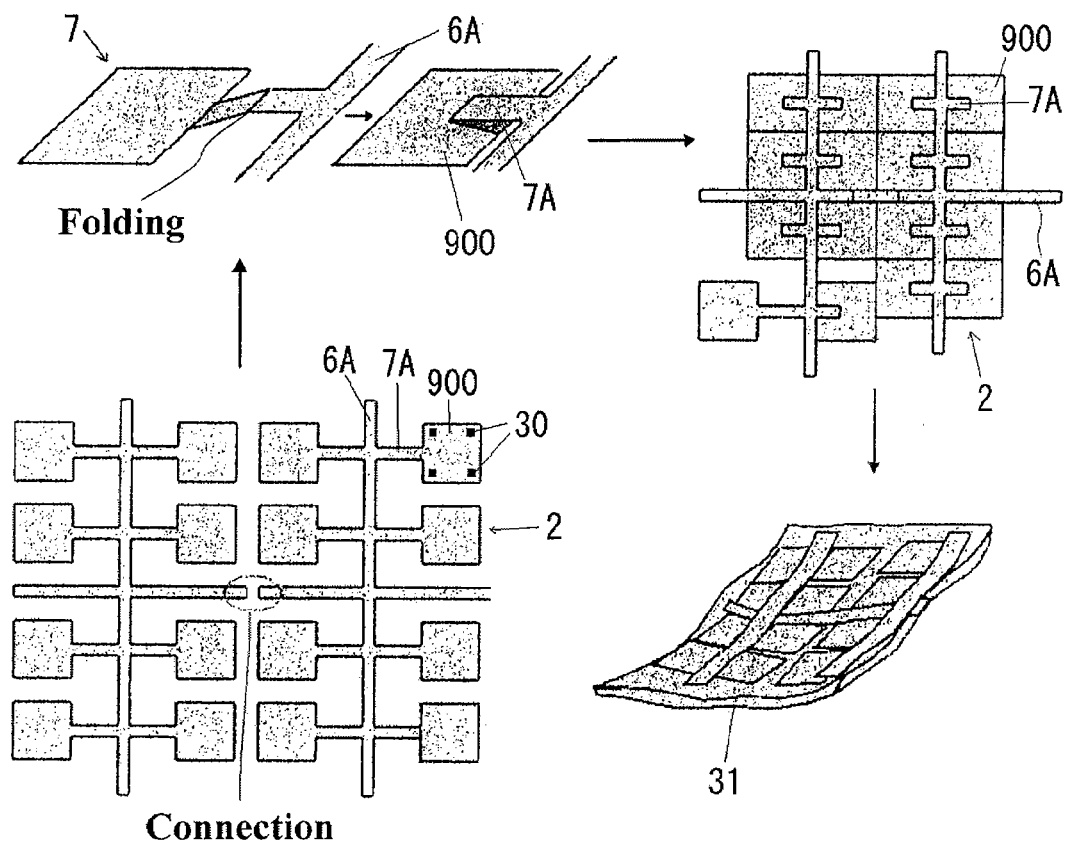
FIG. 22 is a diagram illustrating mounting of experimental examples.

A mounting method is shown in FIG. 22. First, a plurality of the tactile sensor modules 1 are connected. Next, sensor wiring portions are folded in line with curved surfaces for mounting. In this way, it is possible to vary the installation density of the sensing elements by folding the flexible substrate 2 and/or using cutting in this way, and flexible mounting on a curved surface is possible. Finally, mounting is carried out by affixing the urethane foam 31 on the flexible substrate 2 adjusted for installation density. The tactile sensor module of the fourth embodiment is the same as the tactile sensor module of the first embodiment with the exception of the shape of the distal end portions of the second strip-shaped bodies 7 and the disclosure of the first embodiment can therefore be adopted as the description of the tactile sensor module of the fourth embodiment.

INDUSTRIAL APPLICABILITY

The tactile sensors of the present invention are capable of being used as distributed tactile sensors that can be mounted at arbitrary curved surfaces and can therefore be utilized as tactile interfaces for robots, tactile sensors for robots, pressure distribution measurement equipment, and input interfaces for computers etc. The tactile sensor of the present invention can be mounted on arbitrary curved surfaces and is therefore applicable to an extremely wide range of applications such as tactile sensors for robots, and pressure distribution measurement for chairs and beds, etc.

The invention claimed is:

1. A tactile sensor module comprising:
a flexible substrate having a plurality of strips, where at least some of said plurality of strips being first strips branching off from a second strip of said plurality of strips and each of said first strips having a distal end and a proximal end close to a junction between said first and second strips;
a plurality of sensing coupled to the plurality of strips;
one or more communication terminals coupled to the flexible substrate, one or more of said sensing elements arranged on at least one of said first strips exclusive of said junction; and
at least one electronic circuit section provided at the flexible substrate, said electronic circuit section being electrically coupled to at least some of said sensing elements and/or communication terminals via wiring extending at the flexible substrate, and said electronic circuit section having communication functions for receiving information acquired by the plurality of sensing elements and for transmitting the information to the communication terminals,
wherein at least one of said strips comprises a foldable region and/or a cuttable region.

2. The tactile sensor module of claim 1, wherein said foldable region comprises one or a plurality of strips and/or one or a plurality of portions of one or a plurality of strips and wherein said one or plurality of strips are positioned between any sensing elements of said plurality of sensing elements.

3. The tactile sensor module of claim 1, wherein said foldable region comprises a region of the strip having only wiring.

4. The tactile sensor module of claim 1, wherein the foldable region comprises a region of the strip exclusive of the sensing elements, the electronic circuit section, and the communication terminals.

5. The tactile sensor module of claim 1, wherein said cuttable region comprises a region where said region can be cut to remove one or plurality of sensing elements from the flexible substrate while maintaining the communication function for sensing signals of one or a plurality of remaining sensing elements.

6. The tactile sensor module of claim 1, wherein said sensing elements are provided at distal end portions of the strips.

7. The tactile sensor module of claim 1, wherein said communication terminals are provided at distal ends of the strips.

8. The tactile sensor module of claim 6, wherein said flexible substrate comprises:
a first strip-shaped body; and
a plurality of second strip-shaped bodies connected to said first strip-shaped body, and wherein
said first strip-shaped body comprises one or a plurality of strips and at least one electronic circuit section, and
said second strip-shaped body comprises one or a plurality of strips and at least one sensing element at a distal end thereof.

9. The tactile sensor module of claim 8, wherein said second strip-shaped body exclusive of the sensing element mounting portion is the foldable region having only wiring.

10. The tactile sensor module of claim 8, wherein at least one of said second strip-shaped body comprises a cuttable region where said cuttable region can be cut to remove one or more sensing elements of the second strip-shaped body from the flexible substrate while maintaining the communication function for sensing signals of at least one sensing element of the second strip-shaped body.

11. The tactile sensor module of claim 8, wherein said second strip-shaped body is configured from a tree structure where a plurality of strips diverge in a hierarchical manner and one or more sensing elements are provided at distal end portions of each branched strip.

12. The tactile sensor module of claim 8, wherein said second strip-shaped body comprises a base section having a proximal end connected to the first strip-shaped body and a distal end, and an H-shaped strip section comprised of a four branched strips formed integrally at said distal end of the base section and wherein one or more sensing elements are provided at the distal end portions of each branched strip.

13. The tactile sensor module of claim 11, wherein said branched strips of the second strip-shaped body comprise a cuttable region where said cuttable region can be cut to remove one or more sensing elements of the branched strips from the flexible substrate while maintaining the communication function for sensing signals of one or more sensing elements of the remaining branched strips.

14. The tactile sensor module of claim 8, wherein said first strip-shaped body comprises at least one communication terminal at a distal end thereof.

15. The tactile sensor module of claim 14, wherein portions of the first strip-shaped body exclusive of the electronic circuit section, the communication terminals are the foldable regions having only wiring.

16. The tactile sensor module of claim 8, wherein said first strip-shaped body comprises a cuttable region where said cuttable region can be cut to remove one or more sensing elements of the first strip-shaped body and/or the second strip-shaped body connected to the first strip-shaped body from the flexible substrate while maintaining the communication function for sensing signals of at least one sensing element.

17. The tactile sensor module of claim 8, wherein said first strip-shaped body comprises a plurality of radially extending strips with proximal ends thereof being connected to each other, and wherein said electronic circuit section is arranged at the connected portion of the proximal ends.

18. The tactile sensor module of claim 6, wherein at least a portion of the flexible substrate is configured from a tree structure where one or a plurality of strips diverge hierarchically and wherein one or more sensing elements are provided at least two distal end portions of the distal portions of each strip.

19. The tactile sensor module of claim 18, wherein said branched strips of the tree structure comprises a foldable region and/or a cuttable region.

20. The tactile sensor module of claim 19, wherein one or more sensing elements are provided at each distal end of the branched strips, and wherein said each branched strip having the sensing elements at distal end thereof comprises a cuttable region where said cuttable region can be cut to remove one or more sensing elements of the branched strips from the flexible substrate while maintaining the communication function for sensing signals of one or more sensing elements of the remaining branched strips.

21. The tactile sensor module of claim 18, wherein said flexible substrate is configured from a star structure comprising a plurality of strips with proximal ends thereof being connected and wherein the communication terminal is provided at a distal end of at least one strip, one or more sensing elements are provided at distal end portions of remaining strips, and the electronic circuit section is provided at a connected portion at the proximal ends of the strips.

22. The tactile sensor module of claim 1, wherein said strip comprises a strip-shaped base portion and a wide portion formed integrally at a distal end of the base portion and wherein one or a plurality of sensing elements are provided at the wide portion.

23. The tactile sensor module of claim 22, wherein said strip-shaped base portion comprises a foldable region and/or a cuttable region.

24. The tactile sensor module of claim 1, wherein said communication terminal is a serial communication terminal.

25. The tactile sensor module of claim 24, wherein said wiring for between the electronic circuit section and the communication terminals is a serial bus.

26. The tactile sensor module of claim 25, wherein said electronic circuit section is provided with a processor unit and is capable of serial communication with an external device via the serial communication terminals, and wherein said electronic circuit section is configured so as to be capable of sending information acquired by the sensing elements to said external device.

27. The tactile sensor module of claim 26, wherein said electronic circuit section comprises an analog-digital converter and wherein analog information acquired by the sensing elements is received by the processor unit as digital information.

28. The tactile sensor module of claim 1, wherein said tactile sensor module is capable of being connected to other tactile sensor modules via the communication terminals.

29. The tactile sensor module of claim 1, wherein said sensing element is a pressure sensor.

30. The tactile sensor module of claim 29, wherein said pressure sensor comprises a light-emitting element and a light-receiving element and wherein said tactile sensor module further comprises light-scattering elastic material that is mounted on the flexible substrate so as to cover the pressure sensing section such that light emitted from the light-emitting element is scattered and reflected within the elastic material and the light-receiving element acquires a light intensity signal.

31. The tactile sensor module of claim 30, wherein said elastic material is urethane foam.

32. The tactile sensor module of claim 30, wherein said pressure sensor is a reflective photointerrupter.

33. The tactile sensor module of claim 32, wherein a plurality of reflective photointerrupters share analog wiring for taking out detecting signal and the analog-digital converter provided at the electronic circuit section by using time-sharing control of detection of reflective photointerrupters.

34. A method of mounting a tactile sensor using the tactile sensor modules of claim 1, said method comprising:
    adjusting a position or positions of sensing elements by folding one or a plurality of strip; and/or
    reducing the number of sensing elements by cutting out one or a plurality of strips; and
    adjusting the density of the sensing elements and/or adjusting a mounting region of the sensing elements by folding and/or cutting the strips.

35. The method of claim 34, said method comprising connecting a plurality of tactile sensor modules via communication terminals.

* * * * *